United States Patent
Blijdenstein et al.

(10) Patent No.: US 11,412,751 B2
(45) Date of Patent: Aug. 16, 2022

(54) EDIBLE AERATED WATER-IN-OIL EMULSIONS

(71) Applicant: UPFIELD EUROPE B.V., Rotterdam (NL)

(72) Inventors: Theodorus Berend Jan Blijdenstein, Delfgauw (NL); Katrina Gesina Heijne, New York, NY (US); Renate Gemma Jacobine Maria Jacobs, Delft (NL); Sergey Michailovich Melnikov, The Hague (NL)

(73) Assignee: UPFIELD EUROPE B.V., Rotterdam (NL)

(*) Notice: Subject to any disclaimer, the term of this patent is extended or adjusted under 35 U.S.C. 154(b) by 627 days.

(21) Appl. No.: 14/771,410

(22) PCT Filed: Feb. 17, 2014

(86) PCT No.: PCT/EP2014/053016
§ 371 (c)(1),
(2) Date: Aug. 28, 2015

(87) PCT Pub. No.: WO2014/139762
PCT Pub. Date: Sep. 18, 2014

(65) Prior Publication Data
US 2016/0007624 A1   Jan. 14, 2016

(30) Foreign Application Priority Data
Mar. 15, 2013   (EP) .................................. 13159382

(51) Int. Cl.
A23D 7/01       (2006.01)
A23P 30/40      (2016.01)
A23D 7/005      (2006.01)

(52) U.S. Cl.
CPC ........... *A23D 7/013* (2013.01); *A23D 7/0056* (2013.01); *A23P 30/40* (2016.08)

(58) Field of Classification Search
CPC ........ A23D 7/013; A23D 7/0056; A23P 30/40
USPC ...................................... 426/602, 603, 604
See application file for complete search history.

(56) References Cited

U.S. PATENT DOCUMENTS

| | | |
|---|---|---|
| 2,970,917 A | 2/1961 | Melnick |
| 3,519,436 A | 7/1970 | Grace |
| 3,682,656 A * | 8/1972 | Wilton .................. A23D 7/0053 426/603 |
| 4,632,841 A | 12/1986 | Parke et al. |
| 4,874,626 A | 10/1989 | Castenmiller et al. |
| 5,178,897 A | 1/1993 | Tanaka et al. |
| H1394 H | 1/1995 | Dreese |
| 5,478,588 A | 12/1995 | Talignani |
| 5,612,078 A | 3/1997 | Fileti et al. |
| 5,707,668 A | 1/1998 | Andersen |
| 5,897,905 A | 4/1999 | Bialek |
| 5,916,608 A | 6/1999 | Lanting |
| 6,171,624 B1 * | 1/2001 | Reddy .................. A23D 7/0056 426/249 |
| 6,468,578 B1 | 10/2002 | Bodor |
| 2002/0044999 A1 | 4/2002 | Coote |
| 2002/0128500 A1 | 9/2002 | Kolstad et al. |
| 2007/0009643 A1 | 1/2007 | Baseeth et al. |
| 2007/0014911 A1 | 1/2007 | Huizinga et al. |
| 2007/0178209 A1 | 8/2007 | Bialek et al. |
| 2007/0207133 A1 | 9/2007 | Wassell |
| 2009/0142467 A1 | 6/2009 | Aldred et al. |
| 2012/0003377 A1 | 1/2012 | Dobenesque et al. |
| 2012/0052180 A1 | 3/2012 | Esteve et al. |
| 2013/0273230 A1 | 10/2013 | de Man |
| 2015/0140197 A1 | 5/2015 | Adel |

FOREIGN PATENT DOCUMENTS

| | | |
|---|---|---|
| EP | 0285198 | 10/1988 |
| EP | 0627170 | 12/1994 |
| EP | 2052628 | 4/2009 |
| EP | 1716759 | 1/2010 |
| WO | WO9324016 | 12/1993 |
| WO | WO9608156 | 3/1996 |
| WO | WO9733955 | 9/1997 |
| WO | WO0110234 | 2/2001 |
| WO | WO2005079592 | 9/2005 |
| WO | WO2007008557 | 1/2007 |
| WO | WO2010112835 | 10/2010 |

OTHER PUBLICATIONS

Clyde E. Stauffer, Emulsifiers for the Food Industry, Bailey's Industrial Oil and Fat Products, 2005, pp. 229-267, 6th Edition.
De Vocht et al., Structural Characterization of the Hydrophobin SC3, as a Monomer and after Self-Assembly at Hydrophobic/Hydrophilic Interfaces, Biophysical Journal, Apr. 1998, pp. 2059-2068, vol. 74.
Dean D. Duxbury, Distilled monoglycerides offer functional variety to food systems, Food Processing, 1987, pp. 86, 48(5).
E Frede and W Buchhheim, Buttermaking and the churning of blended fat emulsions, Journal of the Society of Dairy Technology, Feb. 1994, pp. 17-27, vol. 47 No. 1.
IPRP2 in PCTEP2014053016, Jun. 6, 2014.
Madsen, Emulsifiers used in margarine low calorie spread, shortening, bakery compound and filling, Fat Science Technology, 1987, pp. 165-172; XP001343373, vol. 89 No. 4, ., ., DK.
Making margarine—90 years of emulsifiers for water-in-oil emulsions, Palsgaard Technical Paper, May 2010, pp. 1-5.
Margarines and Shortenings, Ullmanns Encyclopedia of Industrial Chemistry, 1990, pp. 156-158, vol. A16.
Marszall, Leszek, Messungen des effektiven HLB-Wertes nichtionogener Tenside mittels Phenol-Titrationsmethode, Parfumerie und Kosmetik, 1979, pp. 444-448, vol. 60.
Neumuller, Franck'sce Verlagshandlung, Stuttgart, Rompps Chemie-Lexikon, 1983, pp. 1750-1751, 8th Edition.

(Continued)

*Primary Examiner* — Lien T Tran
*Assistant Examiner* — Tynesha L McClain
(74) *Attorney, Agent, or Firm* — ArentFox Schiff LLP

(57) ABSTRACT

Aerated edible water-in-oil emulsion with an overrun of from 2 to 200% comprising from 10 to 85 wt. % of liquid oil; from 0.5 to 50 wt. % of hardstock fat; from 10 to 85 wt. % of water-phase; from 0.45 to 3 wt. % of lecithin.

18 Claims, No Drawings

(56) References Cited

OTHER PUBLICATIONS

Niall Young and Paul Wassell, Margarines and Spreads, Food Emulsifiers and Their Applications, 2008, pp. 307-326.
Parkay Whipped Vegetable Oil Spread, MINTEL GNPD, May 2011, pp. 1-2.
Search Report in EP13159382, dated Oct. 11, 2013.
Search Report in PCTEP2014053016, dated Mar. 17, 2014.
Wessels, Hydrophobins Proteins that Change the Nature of the Fungal Surface, Advances in Microbial Physiology, 1997, 1-45, vol. 38, NL.
Wosten, et al., Interfacial self-assembly of a hydrophobin into an amphipathic protein membrane mediates fungal attachment to hydrophobic surfaces, EMBO Journal, 1994, 5848-5854, 13, NL.
Wosten, Hydrophobins Multipurpose Proteins, Annu Rev Microbiol, 2001, 625-646, vol. 55, NL.
Written Opinion in EP13159382, dated Oct. 11, 2013.
Written Opinion in PCTEP2014053016, dated Mar. 17, 2014.

* cited by examiner

EDIBLE AERATED WATER-IN-OIL EMULSIONS

FIELD OF INVENTION

The present invention relates to edible aerated water-in-oil emulsions. The invention further relates to a process for the manufacture of said edible aerated water-in-oil emulsions.

BACKGROUND OF INVENTION

Edible water-in-oil emulsions (W/O emulsions) like e.g. margarine and low fat spreads are well known food products that comprise a continuous fat-phase and a dispersed water-phase.

Margarine is generally defined as a composition containing at least 80 wt. % of fat and about 20 wt. % of a water-phase. In contrast, emulsions containing less than 80 wt. % of fat are generally called spreads. Nowadays the terms margarine and spread are often used interchangeably although in some countries the commercial use of the term margarine is subject to certain regulatory requirements. The main difference between margarine and spread is the amount of fat. For the purpose of the present invention the terms margarine and spread are used interchangeably.

The fat-phase of margarine and similar edible W/O emulsions comprise a mixture of liquid oil (i.e. fat that is liquid at ambient temperature) and fat which is solid at ambient temperature. The liquid oil fraction typically comprises liquid unmodified vegetable oil such as soybean oil, sunflower oil, linseed oil, low erucic rapeseed oil (Canola), corn oil (maize oil) and blends of vegetable oils. The solid fat, also called structuring fat or hardstock fat, serves to structure the fat-phase by forming a fat crystal network throughout the continuous oil-phase. It also helps to stabilize the emulsion. The droplets of the water-phase are fixed within the spaces of the lattice of solid fat crystals. This prevents coalescence of the droplets and separation of the heavier water-phase from the fat-phase.

A general process for the manufacture of water-in-oil emulsions is the votator or churn process, which encompasses the following steps:
1. Mixing of the liquid oil, the hardstock fat and if present the water-phase at a temperature at which the hardstock fat is definitely liquid;
2. cooling of the mixture under high shear to induce crystallization of the hardstock fat to create an emulsion;
3. formation of a fat crystal network to stabilize the resulting emulsion and give the product some degree of firmness;
4. modification of the crystal network to produce the desired firmness, confer plasticity and reduce the water droplet size.

These steps are usually conducted in a process that involves apparatus that allow heating, cooling and mechanical working of the ingredients, such as the churn process or the votator process. The churn process and the votator process are described in the Ullmans Encyclopedia, Fifth Edition, Volume A 16, pages 156-158.

Health conscious consumers nowadays desire edible W/O emulsions with a reduced amount of calories, and in particular fat. In addition there is an ongoing need of manufactures to reduce costs. One way this can be achieved is by aerating the W/O emulsions with a suitable amount of gas. However, aerating W/O emulsions can lead to several problems, such as negatively affecting organoleptic properties and/or stability.

For example the water-phase can become less stable due to aeration, as shown by an increased average water droplet size and size distribution. For examples poor organoleptic properties can become apparent, such as by emulsions exhibiting a grainy texture and/or poor oral water-phase release. A good oral water-phase release is important, for example for the perception of water borne flavors such as salts.

WO 2010/112835 addresses the problem of providing confectionery compositions having a reduced calorific and/or fat content by aeration, while maintaining a similar taste and/or texture as chocolate. The problem is addressed by an edible aerated water-in-oil emulsion comprising a fat phase, an emulsifier and an aqueous phase.

U.S. Pat. No. 5,612,078 relates to an aerated filler cream for making reduced fat sandwich cookies and other foods that is soft at room temperature yet is structurally stable during adverse transport conditions. The filler creams exhibit the taste and specific gravity of their high-fat counterparts, while having a substantially lower fat content. The problem is addressed by a substantially anhydrous aerated filler cream comprising polyol.

EP2052628 discloses a method to improve the overrun of aerated W/O emulsions, which involves the use of hydrophobins. In particular, the use of hydrophobins reduces the appearance of disproportionate and coalesced gas bubbles. Some consumers consider hydrophobins as an exotic and non-traditional ingredient in W/O emulsions and therefore as undesirable.

U.S. Pat. No. 4,874,626 relates to edible plastified products comprising a continuous fat phase and a dispersed gas phase, which are subjected to solid or liquid filling, wherein control of the amount of dispersed gas in the end product is improved. The problem is addressed by use of a dispersed gas phase comprising 10 to 100 vol. % of helium.

U.S. Pat. No. 2,970,917 relates to whipped margarines having exceptional plasticity, flavor and stability. This is achieved by a whipped margarine comprising 15 to 40 vol. % of inert gas uniformly and finely dispersed in the margarine in which the entire oil composition has a melting point of about 90 to 105 degrees Fahrenheit and a setting point of about 71 to 82 degrees Fahrenheit.

It is an object of the present invention to provide aerated W/O emulsions having improved organoleptic properties, such as an improved mouthfeel and/or oral water-phase release.

It is a further object of the present invention to provide aerated W/O emulsions having an improved stability, in particularly a more stable water-phase.

It is a further object of the present invention to provide aerated W/O emulsions, which have an improved stability and have improved organoleptic properties.

It is a further object of the present invention to provide aerated W/O emulsions, which have an improved stability and have improved organoleptic properties while comprising little or no added hydrophobins.

SUMMARY OF THE INVENTION

One or more of the above objectives is met by an edible aerated water-in-oil emulsion having a specific amount of lecithin.

Therefore the invention relates to an edible aerated water-in-oil emulsion with an overrun of from 2 to 200% comprising
- from 10 to 85 wt. % of liquid oil;
- from 0.5 to 50 wt. % of hardstock fat;
- from 10 to 85 wt. % of water-phase;
- from 0.45 to 3 wt. % of lecithin.

It was surprisingly found that aerated water-in-oil emulsions according to the invention exhibit improved organoleptic properties, such as an improved mouthfeel and/or an improved oral water-phase release. In addition, said emulsions were found to be stable and in particular were found to have a small average water droplet size and size distribution. For example a small average water droplet size (e.g. as expressed in D3,3) and size distribution (e.g. as expressed in e-sigma) reduces the appearance of water-exudation, the occurrence of watery patches during spreading and improve the microbiological stability.

In contrast, for example:
- Use of a high amount of emulsifier (e.g. 0.45 wt. % or more) other than lecithin, such as a monoglyceride based emulsifier or an emulsifier based on polyglycerol ester of fatty acids (PGPR) leads to an undesirable texture, such as being too soft, waxy/sticky and/or grainy;
- Use of less than 0.45 wt. % or more than 3 wt. % of lecithin leads to aerated W/O emulsions which either do not have a soft (i.e. improved) mouthfeel and/or have a reduced oral water-phase release;
- Use of a high amount of emulsifier other than lecithin or use of lecithin below 0.45 wt. % leads to aerated spreads with an increased average water droplet size and/or size distribution.

The edible aerated water-in-oil emulsion according to the invention can be made using any suitable process known in the art.

Preferably the edible aerated water-in-oil emulsion according to the invention is made in a process comprising the following steps:
a) mixing of the liquid oil, the hardstock fat, lecithin and the water-phase at a temperature at which the hardstock fat is definitely liquid;
b) cooling of the mixture under high shear to create a water-in-oil emulsion;
wherein the mixture at step 'a', step 'b' or after step 'b' is aerated by injecting gas and mixing.

DETAILED DESCRIPTION OF THE INVENTION

Weight percentage (wt. %) is based on the total weight of the product unless otherwise stated. It will be appreciated that the total weight amount of ingredients will not exceed 100 wt. % of the total weight of the produced W/O emulsion.

The terms 'fat' and 'oil' are used interchangeably. Where applicable the prefix 'liquid' or 'solid' is added to indicate if the fat or oil is liquid or solid at ambient temperature as understood by the person skilled in the art. Ambient temperature is considered to be a temperature of about 20 degrees Celsius. Hardstock fat refers to a fat that is solid at ambient temperature as understood by the person skilled in the art.

The terms 'water-in-oil emulsion' and 'W/O emulsion' are used interchangeably.

A good mouthfeel of an emulsion can be characterized by a mouthfeel which is soft (smooth and silky, but not too soft, such as appearing almost liquid-like) and preferably has little and more preferably no perceivable graininess and/or waxy-/stickiness.

Good organoleptic properties can also be characterized by a certain Stevens value of an emulsion. Preferably the edible aerated water-in-oil emulsion according to the invention has a Stevens value, as measured at 5 degrees Celsius, of from 50 to 125, more preferably of from 75 to 120. In particular said Stevens value is measured using was a Stevens penetrometer (Brookfield LFRA Texture Analyser (LFRA 1500), ex Brookfield Engineering Labs, UK) equipped with a stainless steel probe with a diameter of 6.35 mm and operated in "normal" mode; wherein the probe is pushed into the product at a speed of 2 mm/s, a trigger force of 5 gram over a distance of 10 mm Although the emulsions should have a stable water-phase at ambient conditions, the water-phase should preferably be readily released from the fat-phase in the mouth. Said ready release of water-phase in the mouth (i.e. good oral water-phase release) improves the perception of water-born flavors, such as salt. One way to characterize oral water-phase release is by measuring the inversion temperature. Preferably the edible aerated water-in-oil emulsion according to the invention has an inversion temperature of from 25 to 38 degrees Celsius, even more preferably from 25 to 35 degrees Celsius and still even more preferably from 25 to 33 degrees Celsius. A second way to characterize oral water-phase release is by measuring the salt-release of an emulsion, which is subjected to a controlled heating (e.g. 0.2 to 1 degrees Celsius per minute). Preferably the edible aerated water-in-oil emulsion according to the invention has a salt release at 30 degrees Celsius of at least 35 wt. %, more preferably of at least 45 wt. %, even more preferably of at least 55 wt. % and still even more preferably of at least 60 wt. %, based on the total amount of salt.

A good stability of a W/O emulsion can be characterized by a water-phase having a small average water droplet size (e.g. as expressed in D3,3) and size distribution (e.g. as expressed in e-sigma). Preferably the edible aerated water-in-oil emulsion according to the invention has an average water droplet size, as expressed in D3,3, of from 10 to 1 μm (micrometer), more preferably from 8 to 2 μm, even more preferably from 7 to 2.3 μm and still even more preferably from 4.0 to 2.5 μm. Preferably the edible aerated water-in-oil emulsion according to the invention has a water droplet size distribution, as expressed in e-sigma of at most 2.5, more preferably at most 2.3 and even more preferably at most 2.0.

Emulsifiers

Typically fat soluble emulsifiers are used in the manufacture of water-in-oil emulsions, whereas water soluble emulsifiers are typically used to improve the stability of oil-in-water emulsions, such as dressings. The Hydrophilic-Lipophilic Balance (HLB) of an emulsifier is a measure of the degree to which it is hydrophilic or lipophilic. The HLB value is a parameter which is describing the solubility of the surfactant. The HLB value is a concept introduced by Griffin in 1950 as a measure of the hydrophilicity or lipophilicity of nonionic surfactants. It can be determined experimentally by the phenol titration method of Marszall; see "Parfumerie, Kosmetik", Vol. 60, 1979, pp. 444-448; and Rompp, Chemistry Lexicon, 8th Edition 1983, p. 1750. An emulsifier having an HLB value of 8 or lower is usually classified as being a water-in-oil promoting emulsifier and as fat soluble. Emulsifiers with an HLB of more than 8 are usually classified as oil-in-water promoting and as water-soluble.

Lecithin

Lecithin is a collective name of products which consist of a few well-defined substances and many more or less well-defined substances in varying amounts. Common non-purified lecithin (crude lecithin) typically consists in majority of phospholipids. Other substances present in crude lecithin are fats (typically about 35 wt. %), free fatty acids, glycolipids, tocopherols, sterols and carbohydrates.

Preferably the edible aerated water-in-oil emulsion according to the invention comprises from 0.46 to 2 wt. %, more preferably from 0.47 to 1 wt. %, even more preferably from 0.48 to 0.9 wt. % and still even more preferably from 0.65 to 0.85 wt. % of lecithin.

Preferably the lecithin used in the process according to the invention is derived from a vegetable source, more preferably from soybeans, sunflower seeds or rapeseed or any a combination thereof; and even more preferably from sunflower seeds.

Lecithin may be treated, such as by hydrogenation or hydrolysis, to alter the HLB-value. Preferably the HLB value of the lecithin used in the edible aerated emulsions according to the invention is from 8 to 16, more preferably from 10 to 14.

The lecithin phospholipids consist of glycerol with fatty acids bound in positions 1 and 2 and with phosphoric acid bound in position 3. The phosphoric acid moiety may in turn have bound to it another substance which is important in naming the phospholipid. The primary phospholipids which are typically found in lecithin are diglycerides of fatty acids linked to a choline ester of phosphoric acid (phosphatidylcholine); linked to ethanolamine ester of phosphoric acid (phosphatidylethanolamine) or linked to an inositol ester of phosphoric acid (phosphatidylinositol). Preferably the lecithin used in the process according to the invention comprises at least 25 wt. %, more preferably at least 35 wt. % and even more preferably at least 45 wt. % of phosphatidylcholine, phosphatidylethanolamine or phosphatidylinositol or any combination thereof, based on the total weight of the lecithin.

Preferably the lecithin as used in the present invention comprises from 10 to 90 wt. %, more preferably from 15 to 70 wt. %, even more preferably from 20 to 50 wt. %, still even more preferably from 25 to 45 wt. % and still even more preferably from 30 to 40 wt. % of phosphatidylcholine, based on the total weight of lecithin.

Preferably the degree of hydrolysis of the phosphatidylcholine of the lecithin in the edible aerated emulsion according to the invention is from 10 to 25%.

Preferably the degree of hydrolysis of the phosphatidylethanolamine of the lecithin in the edible aerated emulsion according to the invention is from 15 to 30%.

Preferably the lecithin used in the present invention is Bolec Z T, Cetinol, Sunlec Z or Sunlec M, or any combination thereof; and more preferably is Sunlec M. These lecithins are commercially available under said trade names from Unimills B. V., the Netherlands.

Non-Gelling Protein

Non-gelling protein specifically does not include gelling proteins like gelatine or the like. It was observed that addition of non-gelling protein to the edible aerated water-in-oil emulsion according to the invention further improves organoleptic properties and in particular the mouthfeel and oral water-phase release of the composition. Preferably the edible aerated water-in-oil emulsion according to the invention comprises from 0.05 to 3 wt. %, preferably from 0.15 to 2 wt. %, more preferably from 0.2 to 1 wt. % and even more preferably from 0.25 to 0.5 wt. % of non-gelling protein.

Preferably the non-gelling protein comprises and more preferably essentially consists of dairy protein, as for example can be found in milk powder, skimmed milk powder and buttermilk powder. Standard milk powder comprises about 35 wt. % of dairy protein and this means that to include for example 0.5 wt. % of dairy protein in a W/O emulsion about 1.4 wt. % of milk powder has to be added, of course depending on the actual amount of dairy protein present in the milk powder used. Preferably the dairy protein is derived from milk powder, yoghurt powder, skimmed milk powder, buttermilk powder, butter serum powder, whey, whey powder concentrate, whey protein isolate, caseinate or any combination thereof; and even more preferably is derived from buttermilk powder.

It is also possible to provide the non-gelling protein by using milk, for example as part of the aqueous phase, like for example whole fat milk, low fat milk or buttermilk.

Other Emulsifiers

It was surprisingly found that if monoglyceride and/or PGPR were added in a moderate amount in addition to the amount of lecithin according of the invention the stability and organoleptic properties of the aerated water-in-oil emulsions were further improved.

Preferably the edible aerated water-in-oil emulsion according to the invention comprises from 0.01 to 0.35 wt. %, more preferably from 0.02 to 0.3 wt. % and even more preferably from 0.05 to 0.25 wt. % of monoglyceride. Preferably said monoglyceride comprises at least 50 wt. % more preferably 70 wt. % and even more preferably at least 85 wt. % of saturated fatty acids, based on the total weight of monoglyceride. Monoglyceride are commercially available, for example under the trade name Dimodan U/J, Dimodan HP and Dimodan RT, which are commercially available (Supplier: Danisco, Denmark).

Preferably the edible aerated water-in-oil emulsion according to the invention comprises from 0.01 to 0.35 wt. %, more preferably from 0.02 to 0.3 wt. % and even more preferably from 0.05 to 0.25 wt. % of polyglycerol ester of fatty acids. Polyglycerol ester of fatty acids is commercially available, for example under the trade name PGPR, which is commercially available (Supplier: Danisco, Denmark).

Hydrophobins

Hydrophobins are a well-defined class of proteins (Wessels, 1997, Advances in Microbial Physiology 38: 1-45; Wosten, 2001, Annual Reviews of Microbiology 55: 625-646) that are capable of self-assembly at a hydrophobic/hydrophilic interface, and having a conserved sequence:

$$X_n\text{—C—}X_{5\text{-}9}\text{—C—C—}X_{11\text{-}39}\text{—C—}X_{8\text{-}23}\text{—C—}X_{5\text{-}9}\\ \text{—C—C—}X_{6\text{-}18}\text{—C—}X_m \quad (1)$$

where X represents any amino acid, and n and m independently represent an integer. Typically, a hydrophobin has a length of up to 125 amino acids. The cysteine residues (C) in the conserved sequence are part of disulphide bridges. In the context of the present invention, the term hydrophobin has a wider meaning to include functionally equivalent proteins still displaying the characteristic of self-assembly at a hydrophobic-hydrophilic interface resulting in a protein film, such as proteins comprising the sequence:

$$X_n\text{—C—}X_{1\text{-}50}\text{—C—}X_{0\text{-}5}\text{—C—}X_{1\text{-}100}\text{—C—}X_{1\text{-}100}\text{—}\\ \text{C—}X_{1\text{-}50}\text{—C—}X_{0\text{-}5}\text{—C—}X_{1\text{-}50}\text{—C—}X_m \quad (2)$$

or parts thereof still displaying the characteristic of self-assembly at a hydrophobic-hydrophilic interface resulting in a protein film. Said self-assembly can be detected by adsorbing the protein to Teflon and using Circular Dichroism to establish the presence of a secondary structure (in general, α-helix) (De Vocht et al., 1998, Biophys. J. 74: 2059-68). The formation of a film can be established by incubating a Teflon sheet in the protein solution followed by at least three washes with water or buffer (Wosten et al., 1994, Embo. J. 13: 5848-54). The protein film can be visualised by any suitable method, such as labeling with a fluorescent marker or by the use of fluorescent antibodies, as is well established in the art. m and n typically have values ranging from 0 to 2000, but more usually m and n in total are less than 100 or 200. The definition of hydrophobin in the context of the present invention includes fusion proteins of a hydrophobin and another polypeptide as well as conjugates of hydrophobin and other molecules such as polysaccharides.

Preferably the fat continuous product according to the invention comprises less than 0.01 wt. % of hydrophobin, more preferably at most 0.005 wt. % of hydrophobin and even more preferably comprises (essentially) no hydrophobin. It was observed that according to the present invention an edible aerated water-in-oil emulsion could be provided with improved stability and organoleptic properties, such as oral water-phase release, while comprising no hydrophobins.

Aeration and Overrun

The term "aerated" means that gas has been intentionally incorporated into a product, for example by mechanical means. The gas can be any gas, but is preferably, in the context of food products, a food-grade gas such as air, nitrogen, nitrous oxide, or carbon dioxide and more preferably is nitrogen. Hence the term 'aeration' is not limited to aeration using air and encompasses the 'gasification' with other gases as well.

The extent of aeration is measured in terms of % "overrun", which is defined as:

((weight of unaerated mix−weight of aerated product)/(weight of aerated product))×100% wherein the weights refer to a fixed volume of aerated product and unaerated mix (from which the aerated product is made). Overrun is measured at atmospheric pressure. The overrun of an aerated product and the volume fraction of gas in the aerated product generally relate in the following way.

| Overrun [%] | Volume fraction gas [vol. %] |
| --- | --- |
| 10% | 9.1% |
| 20% | 16.7% |
| 50% | 33.3% |
| 100% | 50.0% |
| 200% | 66.7% |
| 300% | 75.0% |
| 500% | 83.3% |

Preferably the edible aerated water-in-oil emulsion according to the invention has an overrun of from 5 to 150%, more preferably from 10 to 125%, even more preferably from 20 to 100% and still even more preferably from 40 to 75%.

Liquid Oil

The liquid oil of the W/O emulsion according to the invention may be a single oil or a mixture of different oils. Preferably at least 50 wt. % of the oil, based on total amount of oil, more preferably at least 60 wt. %, even more preferably at least 70 wt. %, even more preferably at least 80 wt. %, even more preferably at least 90 wt. % and still even more preferably at least 95 wt. %, is of vegetable origin. Most preferably the oil essentially consists of oil of vegetable origin. The liquid oil fraction preferably comprises unmodified vegetable oil such as soybean oil, sunflower oil, linseed oil, low erucic rapeseed oil (Canola), corn oil (maize oil), olive oil, algae oil and blends of vegetable oils. For the purpose of this invention algae oil is considered vegetable oil.

Preferably the edible aerated W/O emulsion according to the invention comprises from 10 to 60 wt. %, more preferably from 12 to 45 wt. %, even more preferably from 13 to 35 wt. % and still even more preferably from 15 to 25 wt. % of liquid oil.

Water-Phase

The water-phase is prepared according to the standard way in accordance with the chosen ingredients. The water-phase of the emulsion may suitably contain a variety of food grade ingredients, such as sodium chloride, acidulant, preservative, water-soluble flavoring, polysaccharides, minerals and water-soluble vitamins. The water-phase may also comprise liquid oil, for example to aid the inclusion of hydrophobic ingredients in the water-phase. The water-phase may also comprise gelling and/or thickening agents like for example starches, vegetable gums, pectin and gelling proteins suitable for such use like gelatin.

Preferably the edible aerated water-in-oil emulsion according to the invention comprises form 20 to 80 wt. %, more preferably from 30 to 70 wt. % and even more preferably from 35 to 65 wt. % of water-phase. Preferably the water-phase comprises from 0.5 to 4 wt. %, more preferably from 1 to 3 wt. % and even more preferably from 1.5 to 2 wt. % of salt based on the weight of the water-phase. Preferably the pH of the water-phase is acidic and more preferably is from 3 to 6, more preferably from 3.5 to 5.5 and even more preferably from 4 to 5.

Hardstock Fat

The edible aerated W/O emulsion according to the invention comprises form 0.5 to 50 wt. % of hardstock fat. The hardstock fat may be a single fat or a mixture of different fats. The hardstock fat may be of vegetable, animal or marine origin. The hardstock may comprise conventional oils and fats which may be of both animal and vegetable origin. Examples of sources of conventional oils and fats include coconut oil, palm kernel oil, palm oil, marine oils, lard, tallow fat, butter fat, soybean oil, safflower oil, cotton seed oil, rapeseed oil, poppy seed oil, corn oil, sunflower oil, olive oil, algae oil and blends thereof. For the purpose of this invention, algae oils are considered vegetable oils. Preferably at least 50 wt. % of the hardstock fat (based on total amount of hardstock fat) is of vegetable origin, more preferably at least 60 wt. %, even more preferably at least 70 wt. %, even more preferably at least 80 wt. %, even more preferably at least 90 wt % and even more preferably at least 95 wt. %. Still even more preferably the hardstock fat essentially consists of hardstock fat of vegetable origin. Preferably the hardstock fat comprises or essentially consists of fat derived from palm fat, allanblackia, pentadesma, shea butter, coconut oil, soybean oil, rapeseed oil, dairy fat or any combination thereof.

The hardstock fat may be modified fat, such as fat which is produced by fractionation, hydrogenation and/or interesterification. In particular fractionation and hydrogenation can be used to alter the melting profile and N-line profile of a fat. Preferably the edible aerated water-in-oil emulsion of the invention comprises hardstock fat which does not contain partially hydrogenated fats and more preferably contains no partially- or fully hydrogenated fats.

Preferably the edible aerated water-in-oil emulsion of the invention comprises only natural hardstock fats.

Preferably the edible aerated water-in-oil emulsion according to the invention comprises from 10 to 45 wt. %, more preferably from 15 to 40 wt. % and even more preferably from 20 to 38 wt. % of hardstock fat. Preferably the hardstock fat comprised by the edible aerated water-in-oil emulsion according to the invention has a solid fat content N10 from 45 to 100 (i.e. a 45 to 100 wt. % of solid fat at 10 degrees Celsius), N20 from 20 to 95 and N35 from 2 to 60; and more preferably has a solid fat content N10 from 50 to 85, N20 from 25 to 70 and N35 from 5 to 40.

Total Fat-Level

Preferably the edible aerated water-in-oil emulsion according to the invention comprises from 15 to 80 wt. %, more preferably from 25 to 70 wt. % and even more preferably from 35 to 65 wt. % of total fat.

Preferably the edible aerated water-in-oil emulsion according to the invention is a spread. A spread means that the emulsion can be spread using a knife on a solid or semi-solid surface like bread or toast when taken from a refrigerator.

Process

Preferably the edible aerated water-in-oil emulsion according to the invention is made in a process comprising the following steps:
a) mixing of the liquid oil, the hardstock fat, lecithin and the water-phase at a temperature at which the hardstock fat is definitely liquid;
b) cooling of the mixture under high shear to create a water-in-oil emulsion;
wherein the mixture at step 'a', step 'b' or after step 'b' is aerated by injecting gas and mixing.

The mixing at step 'a' can be performed using any suitable technique, for example, by use of a heated vessel fitted with a stirrer.

The mixture of step 'a' containing the fat-phase and water-phase may be an oil-in-water emulsion. In that case the emulsion will be inverted into a water-in-oil emulsion in a subsequent process step. Alternatively, the mixture at step 'a' may be a water-in-oil emulsion already, and in that case inversion of the emulsion is not required anymore, only cooling and working of the emulsion in a subsequent process step.

Step 'b' can be performed with any suitable technique known in the art. For example, by use of a conventional scraped surface heat exchanger (a.k.a. A-units) for cooling and crystallizing the mixture of oil and water, followed by a mixing operation of the cooled emulsion, such as in a pin-stirrer (a.k.a. C-unit).

Preferably in the process according to the invention, step 'b' involves one or more surface scraped heat exchangers followed by one or more pin-stirrers and more preferably step 'b' involves at least two surface scraped heat exchangers followed by one pin-stirrer.

Aeration is achieved by injecting gas followed by mixing. For example, at step 'b' or after the water-in-oil emulsions is formed, nitrogen gas can be injected while the emulsion is continuously mixed to incorporate the gas. Non-limiting examples of suitable mixers to incorporate injected gas are pin-stirrers like a C-unit or a Trefa mixer (e.g. Trefa T100 ex Trefa, Angerlo the Netherlands). Preferably in the process according to the invention, gas is injected and mixed-in after step 'b' and more preferably by use of a Trefa mixer.

The invention is now illustrated by the following non limiting examples.

Examples

Spreadability

Spreadability, as measured in spreading score, is determined according to the following protocol. A flexible palette knife is used to spread a small amount of the spread on to fat free paper. The spreading screen is evaluated according to standardized scaling. A score of 1 represents a homogeneous and smooth product without any defects, a 2 refers to the same product but then with small remarks as slightly inhomogeneous or some vacuoles, a 3 refers to the level where defects become almost unacceptable, like loose moisture or coarseness during spreading. A score of 4 or 5 refers to unacceptable products, where the 4 refers to a product still having some spreading properties, but an unacceptable level of defects.

Water Droplet Size Distribution of W/O Emulsions

The normal terminology for Nuclear Magnetic Resonance (NMR) is used throughout this method. On the basis of this method the parameters D3, 3 and exp($\sigma$) of a lognormal water droplet size distribution can be determined. The D3, 3 is the volume weighted mean droplet diameter as typically measured in micrometer and exp($\sigma$) (e-sigma) is the standard deviation of the logarithm of the droplet diameter.

The NMR signal (echo height) of the protons of the water in a water-in-oil emulsion are measured using a sequence of 4 radio frequency pulses in the presence (echo height E) and absence (echo height E*) of two magnetic field gradient pulses as a function of the gradient power. The oil protons are suppressed in the first part of the sequence by a relaxation filter. The ratio (R=E/E*) reflects the extent of restriction of the translational mobility of the water molecules in the water droplets and thereby is a measure of the water droplet size. By a mathematical procedure—which uses the lognormal droplet size distribution—the parameters of the water droplet size distribution D3, 3 (volume weighed geometric mean diameter) and $\sigma$ (distribution width) are calculated.

A Bruker magnet with a field of 0.47 Tesla (20 MHz proton frequency) with an air gap of 25 mm is used (NMR Spectrometer Bruker Minispec MQ20 Grad, ex Bruker Optik GmbH, DE).

Stevens Value

A Steven value indicates the hardness or firmness of a product. The Stevens value was measured with a Stevens penetrometer (Brookfield LFRA Texture Analyser (LFRA 1500), ex Brookfield Engineering Labs, UK) equipped with a stainless steel probe with a diameter of 6.35 mm and operated in "normal" mode. The probe is pushed into the product at a speed of 2 mm/s, a trigger force of 5 gram from a distance of 10 mm. The force required is read from the digital display and is expressed in grams.

To measure the Stevens value at 5 degrees Celsius a W/O emulsion is first stored at 5 degrees Celsius for 24 hours before measuring.

To measure the Stevens value at 20 degrees Celsius a W/O emulsion is first stored at 20 degrees Celsius for 24 hours before measuring.

Mouthfeel—Sensorial Attributes

The sensorial attributes of spreads was assessed by panel tasting. The tasters were asked to qualitatively describe the attributes associated with the texture (such as spreading) and mouthfeel of the spreads prepared according to the invention and of comparative samples.

In particular:
- 'Grainy' indicates the sensation of solid particles in the emulsion
- 'Too soft' indicates a material with an almost liquid texture
- 'Sticky/waxy' indicates the material does not appreciably soften when placed in the mouth. In addition emulsion material may stick to oral cavity and/or form a waxy layer.
- 'Regular' indicates spreading behavior and mouthfeel of a spread according to Comparative A (i.e. not according to the invention).
- 'Soft' indicates easy spreading and a smooth silky mouth feel compared to 'Regular'.
- 'Hard' indicates more laborious spreading and a less smooth mouthfeel compared to 'Regular'.

Oral Water-Phase Release—Salt Release During Controlled Heating

A sample of 1 gram of a W/O emulsion was placed in a sample holder. The holder is made of semi-permeable material allowing for the diffusion of ions. The sample holder is itself placed in to a double walled glass vessel containing 130 milliliter of nano pure water of about 20 Degrees Celsius, which is stirred at 50 rpm. The cooling medium flowing through the double wall was thermostated by a Lauda laboratorium water bath. The temperature protocol of the water bath was as follows:
(1) From 20 to 30 Degrees Celsius at 1 Degrees Celsius per minute
(2) From 30 to 50 Degrees Celsius at 0.2 Degrees Celsius per minute
(3) From 50 to 70 Degrees Celsius at 1 Degrees Celsius per minute The conductivity of the water-system was monitored throughout the protocol and expressed as Ohm per cm.

At regular intervals during the protocol a water sample was analyzed to determine the type of salt and the salt concentration using Inductively Coupled Plasma Mass Spectrometry. Based on the conductivity profile, the wt. % of salt released at a certain temperature could be calculated.

Oral Water-Phase Release—Inversion Temperature

A sample of approximately 5 mg of emulsion is placed on a microscopy object glass and carefully compressed, while being careful to minimize shear deformation, with a cover glass. This microscopic preparate is placed on a microscope with temperature control. The temperature is increased in steps of 5° C. The temperature at which both inversion of the emulsion and transition of air bubbles into the water-phase are completed is denoted here as the phase inversion temperature.

Manufacture of Edible W/O Emulsions

The W/O emulsions according to Example 1, 2 and Comparative A to G (60 wt. % fat emulsions) were made with a composition as set out in Table 1. The W/O emulsions according to Example 3, 4 and Comparative H to K (39 wt. % fat emulsions) were made with a composition as set out in Table 2.

TABLE 1

Composition of W/O emulsions of Example 1, 2 and Comparatives A to G (numbers represent wt. % for ingredients and % for overrun).

|  | Ex. 1 | Ex. 2 | Comp. A | Comp. B | Comp. C |
|---|---|---|---|---|---|
| [1]InES28 | 36 | 36 | 36 | 36 | 36 |
| Rapeseed oil | 24 | 24 | 24 | 24 | 24 |
| [2]Sunlec M | 0.5 | 0.8 | — | 0.2 | — |
| [3]Dimodan HP | 0.2 | 0.2 | 0.2 | 0.2 | 0.5 |
| [4]Dimodan RT | — | — | — | — | — |
| [5]Dimodan UJ | — | — | — | — | — |
| [6]PGE55 | — | — | — | — | — |
| beta-carotene | 0.06 | 0.06 | 0.06 | 0.06 | 0.06 |
| flavors | 0.012 | 0.012 | 0.012 | 0.012 | 0.012 |
| NaCl | 0.6 | 0.6 | 0.6 | 0.6 | 0.6 |
| Butter milk powder | 0.5 | 0.5 | 0.5 | 0.5 | 0.5 |
| Potassium sorbate | 0.12 | 0.12 | 0.12 | 0.12 | 0.12 |
| Water | Balance | Balance | Balance | Balance | Balance |
| Overrun (%) | 54 | 54 | 54 | 54 | 54 |

|  | Comp. D | Comp. E | Comp. F | Comp. G |
|---|---|---|---|---|
| [1]InES28 | 36 | 36 | 36 | 36 |
| Rapeseed oil | 24 | 24 | 24 | 24 |
| [2]Sunlec M | — | — | — | — |
| [3]Dimodan HP | 1.0 | — | — | — |
| [4]Dimodan RT | — | 1.0 | — | — |
| [5]Dimodan UJ | — | — | 1.0 | — |
| [6]PGE55 | — | — | — | 1.0 |
| beta-carotene | 0.06 | 0.06 | 0.06 | 0.06 |
| flavors | 0.012 | 0.012 | 0.012 | 0.012 |
| NaCl | 0.6 | 0.6 | 0.6 | 0.6 |
| Butter milk powder | 0.5 | 0.5 | 0.5 | 0.5 |
| Potassium sorbate | 0.12 | 0.12 | 0.12 | 0.12 |
| Water | Balance | Balance | Balance | Balance |
| Overrun (%) | 54 | 54 | 54 | 54 |

[1]InES28 is an interesterified mixture of 65% dry fractionated palm oil stearin with a melting point of 52 degrees Celsius and 35% palm kernel oil.
[2]Sunlec M (Supplier: Unimills B.V., the Netherlands) is lecithin comprising 36 wt. % phosphatidylcholine, 14 wt. % phosphatidylethanolamine and 35 wt. % phosphatidylinositol.
[3]Dimodan HP: molecularly distilled mono-/diglyceride mixture derived from fully hardened palm oil (90% monoglyceride) (Supplier: Danisco, Denmark).
[4]Dimodan RT: molecularly distilled mono-/diglyceride mixture derived from partially hardened rapeseed oil (90% monoglyceride) (Supplier: Danisco, Denmark).
[5]Dimodan UJ: molecularly distilled mono-/diglyceride mixture derived from unsaturated vegetable oil-paste (90% monoglyceride) (Supplier: Danisco, Denmark).
[6]PGE55: polyglycerol ester of fatty acids (Grindsted PGE55, Supplier Danisco, Denmark)

TABLE 2

Composition of W/O emulsions of Example 3, 4 and Comparatives H to K (numbers represent wt. % for ingredients and % for overrun).

|  | Comp. H | Ex. 3 | Ex. 4 | Comp. I | Comp. J | Comp. K |
|---|---|---|---|---|---|---|
| [1]InES01 | 22 | 22 | 22 | 22 | 22 | 22 |
| Rapeseed oil | 16 | 16 | 16 | 16 | 16 | 16 |
| [2]Sunlec M | 0.4 | 0.5 | 0.8 | 0.4 | 0.5 | 0.8 |
| [3]Dimodan HP | 0.2 | 0.2 | 0.2 | 0.2 | 0.2 | 0.2 |
| beta-carotene | 0.05 | 0.05 | 0.05 | 0.05 | 0.05 | 0.05 |
| [4]PGPR | 0.10 | 0.10 | 0.10 | 0.10 | 0.10 | 0.10 |
| flavor | <0.01 | <0.01 | <0.01 | <0.01 | <0.01 | <0.01 |
| NaCL | 0.5 | 0.5 | 0.5 | 0.5 | 0.5 | 0.5 |
| [5]Colflo67 | 1.4 | 1.4 | 1.4 | 1.4 | 1.4 | 1.4 |
| Butter milk powder | 1.0 | 1.0 | 1.0 | 1.0 | 1.0 | 1.0 |
| Potassium sorbate | 0.15 | 0.15 | 0.15 | 0.15 | 0.15 | 0.15 |
| Water | Balance | Balance | Balance | Balance | Balance | Balance |
| Overrun (%) | 54 | 54 | 54 | 0 | 0 | 0 |

[1]InES01 is an interesterified mixture of 36% dry fractionated palm oil stearin with a melting point of 52 degrees Celsius, 28% Rapeseed oil, 27% coconut oil and 9% fully hardened rapeseed oil with a melting point of 68 degrees Celsius.
[2]Sunlec M (Supplier: Unimills B.V., the Netherlands) is lecithin comprising 36 wt. % phosphatidylcholine, 14 wt. % phosphatidylethanolamine and 35 wt. % phosphatidylinositol.
[3]Dimodan HP: molecularly distilled mono-/diglyceride mixture derived from fully hardened palm oil (90% monoglyceride) (Supplier: Danisco, Denmark).
[4]PGPR: polyglycerol polyricinoleate (Supplier: Danisco, Denmark).
[5]Colfo 67: waxy corn starch, modified using cross-linking by acetic anhydride and substituted by adipic acid anhydride (Supplier: National Starch, The Netherlands).

Process to Manufacture Emulsions of Example 1, 2 and Comparatives A to G

All fat-phase ingredients (InES28, beta-carotene, lecithin/monoglyceride/PGE55, flavors) were added to rapeseed oil and dissolved by heating the mixture to 60 degrees Celsius. (Dimodan-based emulsifiers and PGE were first pre-dissolved in a small amount of rapeseed oil heated by heating to 80 degrees Celsius, before being adding to the rapeseed oil at 60 degrees Celsius.)

In a separate vessel, the water-phase ingredients (Butter milk powder, NaCl, potassium sorbate) were added and dissolved in the water by heating to 60 degrees Celsius. Subsequently the pH was adjusted to 4.6 by adding citric acid (50 wt. % aqueous citric acid solution was used).

A premix of the water-in-oil type was prepared by mixing the above fat-phase and water-phase in a double walled stainless steel vessel equipped with a stirrer operating at about 80 rpm and one baffle kept at 60 degrees Celsius. This mixture was pumped through a Pasteurization Unit, a set of Scraped Surface Heat Exchangers (A-units), a pin stirrer (C-unit) and a Trefa mixer. The sequence being as follows: Tank-pump-flow meter-pressure meter-Pasteurisor-A-A-C-A-$N_2$-injection-Trefa mixer. Wherein the A-units were fitted with a rotor equipped with two stainless steel scraper blades operating at 800 rpm having an annulus of 3 mm and a volume of 18 cubic cm and wherein the C-unit had a volume of 1.5 liters and was fitted with a rotor and stator both having two rows of 4 pins and operating at 150 rpm. The throughput was about 100 kg per hour with a temperature profile of resp. about 24, 15, 17, 13 degrees Celsius in the A-A-C-A units.

The W/O emulsions were aerated to the level as shown in Table 1. Aeration was carried out by injecting $N_2$ gas at a pressure of around 50 Bar while mixing to provide an overrun of 54%. The gas phase was mixed in the emulsion using a Trefa mixer (Trefa T100, Angerlo, the Netherlands). The Trefa mixer consists of a premixing chamber and a rotor containing multiple rows of pins operating at a rotor speed of 300 rpm.

Products were packaged in 250 ml tubs and stored at 5 degrees Celsius.

Process to Manufacture Emulsions of Example 3, 4 and Comparatives H to K

All fat-phase ingredients (InES01, beta-carotene, lecithin, Dimodan HP, PGPR, flavors) were added to rapeseed oil and dissolved by heating to 60 degrees Celsius. (Dimodan HP was first pre-dissolved in a small amount of rapeseed oil heated by heating to 80 degrees Celsius, before being adding to the rapeseed oil at 60 degrees Celsius.)

In a separate vessel, the water-phase ingredients (Butter milk powder, NaCl, Colflo67 potassium sorbate) were added and dissolved in the water by heating to 60 degrees Celsius. Subsequently the pH was adjusted to 4.9 by adding lactic acid (50 wt. % aqueous lactic acid solution was used).

A premix of the oil-in-water type was prepared by mixing the above fat-phase and water-phase in a double walled stainless steel vessel equipped with a stirrer operating at about 80 rpm and one baffle kept at 60 degrees Celsius. This mixture was pumped through a Pasteurization Unit, a set of Scraped Surface Heat Exchangers (A-units), a pin stirrer (C-unit) and a Trefa mixer. The sequence being as follows: Tank-pump-flow meter-pressure meter-Pasteurisor-A-A-A-C—$N_2$-injection-Trefa mixer. Wherein the A-units have a rotor equipped with two stainless steel scraper blades operating at 800 rpm having an annulus of 3 mm and a volume of 18 cubic cm and where the C-unit has a volume of 1.5 liters and is equipped with a rotor and stator both having two rows of 4 pins and operating at 1500 rpm. In the C-unit, the emulsion is inverted from 0/W to W/O. The throughput is about 150 kg per hour with a temperature profile of resp. about 21, 14, 11, 18 degrees Celsius in the A-A-A-C units.

In case of Comparative I, J and K the W/O emulsions were not actively aerated.

In case of Example 3, Example 4 and Comparative H, aeration was carried out by injecting $N_2$ gas at a pressure of around 50 Bar while mixing to provide an overrun of 54%. The gas phase was mixed in the emulsion using a Trefa mixer (Trefa T100, Angerlo, the Netherlands). The Trefa mixer consists of a premixing chamber and a rotor containing multiple rows of pins operating at a rotor speed of 300 rpm.

Products were packaged in 250 ml tubs and stored at 5 degrees Celsius.

Results

The average water droplet size and size distribution (D3, 3 and e-sigma), the phase inversion temperature and mouthfeel of Example 1, 2 and Comparatives A to H were analyzed after the emulsions (which were all spreads) had been stored for one week at 5 degrees Celsius.

TABLE 3

Water-phase stability, mouthfeel and phase inversion analysis of W/O emulsions of Example 1, 2 and Comparatives A to G (temperature is measured in degrees Celsius).

| | Water-phase | | Phase inversion | |
| --- | --- | --- | --- | --- |
| | D3,3 (μm) | e-sigma | temperature | Mouthfeel |
| Example 1 | 3.18 | 1.92 | 37 | Soft (good) |
| Example 2 | 2.76 | 1.68 | 30 | Soft (good) |
| Comparative A | 3.37 | 2.2 | 45 | Regular texture |
| Comparative B | 3.7 | 2.02 | 40 | Regular texture |
| Comparative C | 3.49 | 2.42 | 40-45 | Slightly grainy (bad) |
| Comparative D | 4.86 | 2.24 | 45 | Grainy (bad) |
| Comparative E | 4.09 | 1.85 | 40-45 | Regular texture |
| Comparative F | 6.2 | 2.2 | 40-45 | Too soft (bad) |
| Comparative G | 2.94 | 2 | 40-45 | Sticky/waxy |

Clearly the aerated spreads according to the invention (Example 1 and 2) show a superior combination of properties in terms of mouthfeel, water-phase release and stability of the water-phase. Use of a high amount of other emulsifiers, such as monoglyceride (Comparative C to F) or polyglycerol ester of fatty acids (Comparative G); or lecithin in an amount below the level of the invention, negatively influences one or more of said properties. In particular, clearly the use of lecithin in a concentration according to the invention (Example 1 and 2) provides a superior combination of properties, when compared with a lecithin concentration not according to the invention (Comparative A and B).

The water droplet size and size distribution (D3, 3 and e-sigma), firmness (Stevens value), spreadability and oral water-phase release were analyzed after of Example 3, 4 and Comparatives H after the emulsions (spreads) had been stored for one week at 5 degrees Celsius (Table 4). Table 4 shows the results of these analysis for the 35 wt. % fat spreads comprising either 54% overrun (Example 3, 4 and Comparatives H) or 0% overrun (i.e. not intentionally added gas, Comparatives I to K).

TABLE 4

Water-phase stability, firmness, spreading and salt release analysis of W/O emulsions of Example 3, 4 and Comparatives H to K.

| | Water-phase | | Stevens value | | Spreadability (on a 5 point scale) | [1]Salt release (wt. %) |
|---|---|---|---|---|---|---|
| | D3,3 (μm) | e-sigma | 5° C. | 20° C. | | |
| Comparative H | 6.9 | 2.7 | 130 | 35 | 2 | 19 |
| Example 3 | 6 | 2.2 | 110 | 31 | 2 | 65 |
| Example 4 | 6.6 | 1.9 | 90 | 25 | 3 | 36 |
| Comparative I | 7.9 | 2.4 | 220 | 50 | 2 | 15 |
| Comparative J | 5.9 | 2.7 | 200 | 45 | 2 | 33 |
| Comparative K | 5.8 | 3.2 | 200 | 35 | 2 | 66 |

[1]measured at 30 degrees Celsius in wt. % based on total salt.

Clearly also aerating low-fat emulsions improves the mouthfeel of the W/O emulsions by provides a superior combination of stability, and organoleptic properties such as (low) Stevens value and oral water-phase release. Looking specifically at the aerated spreads, W/O emulsions having a lecithin concentration according to the invention (Example 3 and 4) have a superior salt release and Stevens value versus Comparative I.

Table 5 shows the results of mouthfeel analysis for the spreads according to Example 3, 4 and Comparatives H to K.

TABLE 5

Mouthfeel of the W/O emulsions of Examples 3, 4 and Comparatives H to K.

| | Mouthfeel |
|---|---|
| Comparative H | Quick oral melting, regular (medium-hard) perceived texture |
| Example 3 | Quick oral melting, 2$^{nd}$ creamiest of all samples, soft "velvety" perceived texture |
| Example 4 | Very quick oral melting, most creamy of all samples, soft "velvety" perceived texture |
| Comparative I | Quick oral melting, hard perceived texture |
| Comparative J | Long oral melting (sticky mouthfeel), hard perceived texture |
| Comparative K | Quick oral melting, hard perceived texture |

The invention claimed is:

1. An edible aerated water-in-oil emulsion, comprising from 10 to 85 wt. % of a liquid oil;
   from 0.5 to 50 wt. % of a hardstock fat;
   from 10 to 85 wt. % of a water-phase; and
   from 0.45 to 3 wt. % of a lecithin;
   wherein the emulsion has a Stevens value at 5° C. of from 50 to 125, and an overrun of from 2 to 200%; and a water droplet size distribution, as expressed in e-sigma, of at most 2.0.

2. The edible aerated water-in-oil emulsion of claim 1, comprising from 0.46 to 2 wt. % of the lecithin.

3. The edible aerated water-in-oil emulsion of claim 1, wherein the lecithin comprises from 10 to 90 wt. % of phosphatidylcholine, based on the total weight of the lecithin.

4. The edible aerated water-in-oil emulsion of claim 1, further comprising from 0.05 to 3 wt. % of a non-gelling protein.

5. The edible aerated water-in-oil emulsion of claim 4, wherein the non-gelling protein comprises a dairy protein.

6. The edible aerated water-in-oil emulsion of claim 1 further comprising from 0.01 to 0.35 wt. % of a monoglyceride, a polyglycerol ester of fatty acids, or both.

7. The edible aerated water-in-oil emulsion of claim 1, wherein the overrun is from 5 to 150%.

8. The edible aerated water-in-oil emulsion of claim 1, comprising from 10 to 60 wt. % of the liquid oil.

9. The edible aerated water-in-oil emulsion of claim 1, comprising from 20 to 80 wt. % of the water-phase.

10. The edible aerated water-in-oil emulsion of claim 1, wherein the hardstock fat has a solid fat content N10 from 45 to 100, N20 from 20 to 95 and N35 from 2 to 60.

11. The edible aerated water-in-oil emulsion of claim 1, comprising from 10 to 45 wt. % of the hardstock fat.

12. The edible aerated water-in-oil emulsion of claim 1, wherein the emulsion is a wrapper or a spread.

13. A method of manufacturing an edible aerated water-in-oil emulsion comprising:
   from 10 to 85 wt. % of a liquid oil,
   from 0.5 to 50 wt. % of a hardstock fat,
   from 10 to 85 wt. % of a water-phase, and
   from 0.45 to 3 wt. % of a lecithin,
   wherein the emulsion has a Stevens value at 5° C. of from 50 to 125, an overrun of from 2 to 200%, and a water droplet size distribution, as expressed in e-sigma, of at most 2.0;
   wherein the method comprises the following steps:
   a) mixing the liquid oil, the hardstock fat, the lecithin, and the water-phase at a temperature at which the hardstock fat is entirely liquid; and
   b) cooling the mixture under high shear to create a water-in-oil emulsion;
   wherein the mixture is aerated by injecting gas and mixing at step "a" or "b," or after step "b".

14. The method of claim 13, wherein the cooling of the mixture under high shear in step "b" is performed by one or more surface scraped heat exchangers followed by one or more pin-stirrers.

15. The edible aerated water-in-oil emulsion of claim 1, wherein the emulsion has a water droplet size, as expressed in D3,3, of from 4 to 2.5 μm.

16. The edible aerated water-in-oil emulsion of claim 15, wherein the overrun is from 40 to 75%.

17. The edible aerated water-in-oil emulsion of claim 1, wherein the overrun is from 40 to 75%.

18. The edible aerated water-in-oil emulsion of claim 2, wherein the overrun is from 40 to 75% and the emulsion has a water droplet size, as expressed in D3,3, of from 4 to 2.5 μm.

* * * * *